United States Patent [19]
Rodes

[11] Patent Number: 6,067,935
[45] Date of Patent: May 30, 2000

[54] ARTICLE OF MANUFACTURING FOR A PORTABLE ANIMAL WATERING CONTAINER

[76] Inventor: Alvin N. Rodes, 990 Rufus Ct., Hayward, Calif. 94541

[21] Appl. No.: 09/326,129

[22] Filed: Jun. 4, 1999

[51] Int. Cl.⁷ ........................................................ A01K 7/00
[52] U.S. Cl. ................................................................. 119/72
[58] Field of Search ............................. 119/61, 51.5, 72, 119/74, 75; 206/223; 220/501, 502, 23.8, 23.83, 661

[56] References Cited

U.S. PATENT DOCUMENTS

| | | | |
|---|---|---|---|
| 169,735 | 11/1875 | Schirmer | 206/223 |
| 897,148 | 8/1908 | Ramirez | 206/223 |
| 1,048,344 | 12/1912 | Risbon | 206/223 |
| 3,076,435 | 2/1963 | Seymour | 119/61 |
| 4,192,256 | 3/1980 | Clugston | 119/51.5 |

*Primary Examiner*—Thomas Price

[57] ABSTRACT

An article of manufacture for a portable animal watering container having a fluid reservoir having a resealable opening for accessing liquid and where the container is capable of carrying a volume of liquid, an open receptacle coupled to and situated in the reservoir near the opening, the receptacle having apertures on its bottom surface permitting communication between an interior of the reservoir and the receptacle, and where the apertures permit entry of the liquid into the receptacle up to a low level, so as to minimize spillage of the liquid from the receptacle. In a preferred embodiment the receptacle has apertures sized to permit a small amount of liquid to enter the receptacle at any one time and has a tight lid to prevent water from escaping during transport of the container. In another preferred embodiment, the receptacle is shaped in a frusto-conical or generally cylindrical.

12 Claims, 4 Drawing Sheets

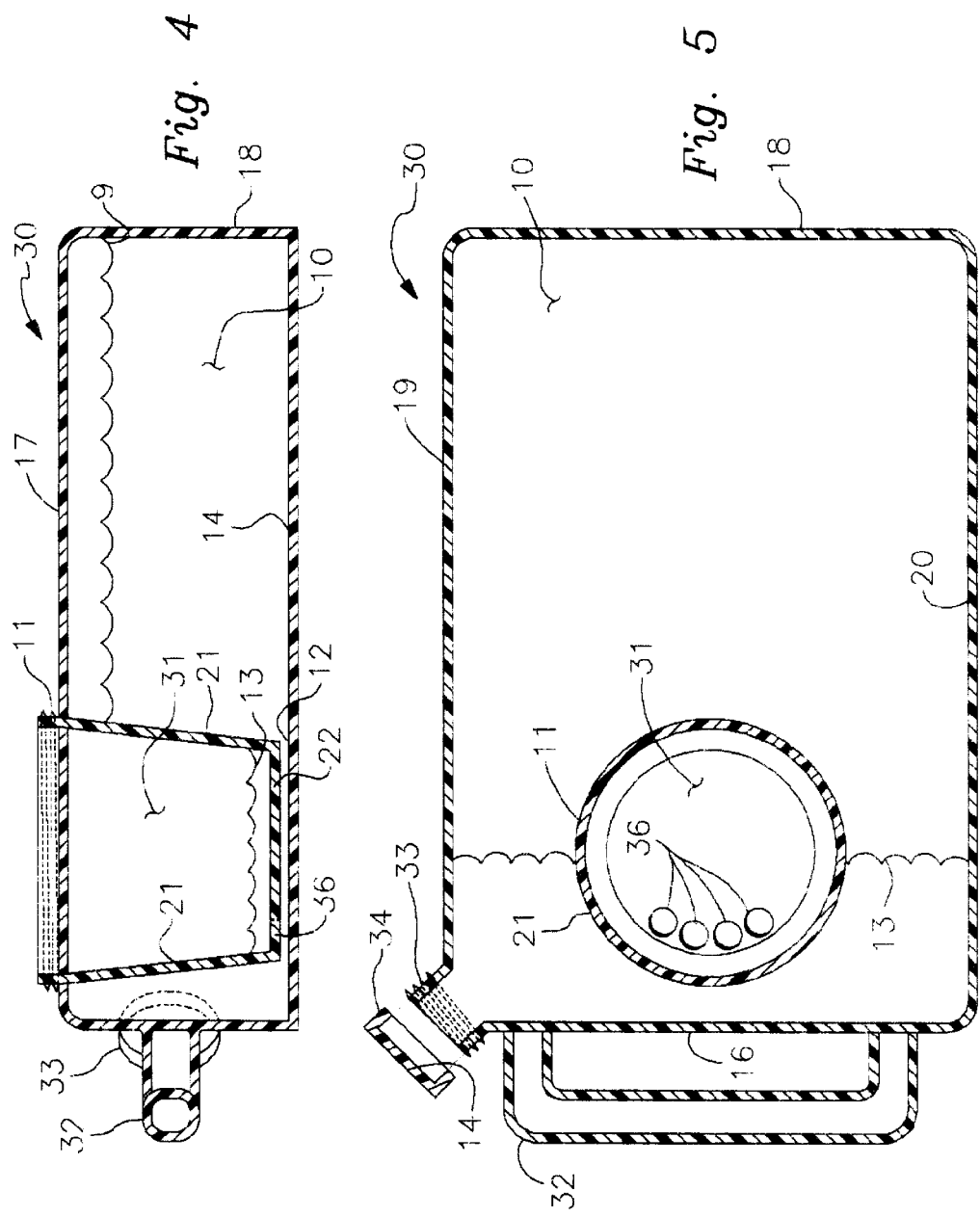

ARTICLE OF MANUFACTURING FOR A PORTABLE ANIMAL WATERING CONTAINER

BACKGROUND OF THE INVENTION

1. Field of the Invention

This invention relates generally to animal watering containers and more specifically to a portable animal watering container that prevents splashing or spilling while an animal is drinking out of it, at home or in a moving vehicle.

2. Description of the Related Art

Various attempts to solve splashing and spilling problems in animal watering containers are shown in U.S. Pat. No. 3,152,576 for Anti-splash and Feeding Device for Pet Animals, U.S. Pat. No. 3,589,340 for Animal Feeder, and U.S. Pat. No. 4,286,546, Dog Watering Dish. While the devices disclosed in the above patents reduce the amount spilled in most situations, they do not eliminate the problems while the bowl is in movement.

Various attempts have also been made to create animal feeding devices that consist of familiar, expected and obvious structural shapes. These include U.S. Pat. Nos. 4,984,723; 4,880,112; 5,081,957; 5,105,768; 4,436,056; 5,209,184; 3,568,875; and 4,350,274.

U.S. Patent. No. 5,738,039 shows a portable pet bowl but does not reduce the spilling, splashing, and evaporation, or have an easy carrying handle. None of the foregoing patents has non-spilling, non-splashing, non-evaporation, easy carrying handle to carry it like a suitcase, clear plastic top half for contents visibility, low profile non-tipping, and a minimum size for less contamination, drinking bowl, features all in one animal watering container like the present invention.

ADVANTAGES

Accordingly it is an advantage of the present invention improve animal watering containers to reduce spilling or splashing while being moved abruptly or while in a moving vehicle.

Another advantage of the present invention is to have an animal watering container that prevents 90% evaporation.

Another advantage of the present invention is to have an animal watering container that has a handle to make it easier to refill and carry like a suitcase.

It is yet another advantage of the invention to provide a low profile design to eliminate tipping over when in use at home or while being used in a moving vehicle.

It is another advantage of the invention to provide a container having a low liquid level in the drinking bowl to eliminate spilling and splashing of its contents and to prevent damage to floors of homes or vehicles.

It is still another advantage of the invention to provide a portable animal watering container that can be manufactured in various sizes from the size for a rodent to the size for a horse or an elephant.

It is still another advantage of the invention to provide a bowl with a top opening having a screw-on lid to prevent evaporation 100% when the container is not in use.

BRIEF SUMMARY OF THE INVENTION

In accordance with a preferred embodiment, there is disclosed an article of manufacture for a portable animal watering container having a fluid reservoir having a resealable opening for accessing liquid and where said container is capable of carrying a volume of liquid, an open receptacle coupled to and situated in the reservoir near the opening, the receptacle having apertures on its bottom surface permitting communication between an interior of the reservoir and the receptacle, and where the apertures permit entry of the liquid into the receptacle up to a low level, to minimize spillage of the liquid from the receptacle. As the liquid is consumed by the animal, the flow of liquid from the reservoir to the receptacle replaces the liquid to the original level.

BRIEF DESCRIPTION OF THE DRAWINGS

FIG. 4 A side view of the present invention.

FIG. 5 A top view of the present invention.

DETAILED DESCRIPTION OF A PREFERRED EMBODIMENT OF THE INVENTION

Figure 1:
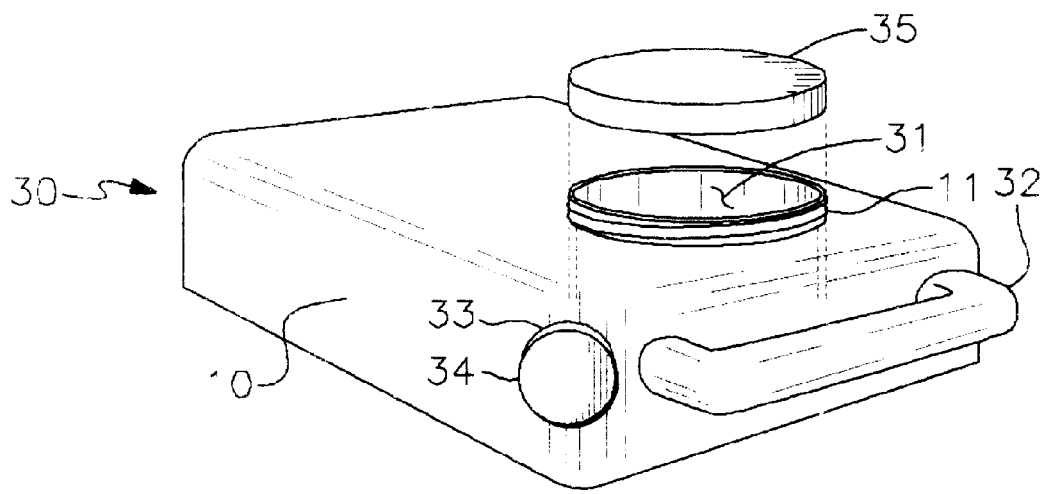
FIG. 1 An isometric view of the preferred embodiment of the Portable Animal Watering Container constructed in accordance with the principles of the present invention.

Turning now to FIG. 1, there is shown a portable animal watering container 30, according to the present invention. Drinking bowl 31 has screw on-off lid 35 with screw threads 37. Carrying handle 32 is molded as an integral part of the container 30 but may alternatively be a strap type handle if desired. Filling spout 33 and spout screw-on lid 34 permits access to reservoir 10 for filling the reservoir with liquid.

Figure 2:
FIG. 2 An illustration of a person carrying the present invention.

FIG. 2 depicts a person carrying the container like a suitcase. As will be evident from FIG. 5, the container may be substantially filled and capable of being carried without spilling any liquid since the bowl only has holes at a point higher than the water line shown in FIG. 2.

Figure 3:
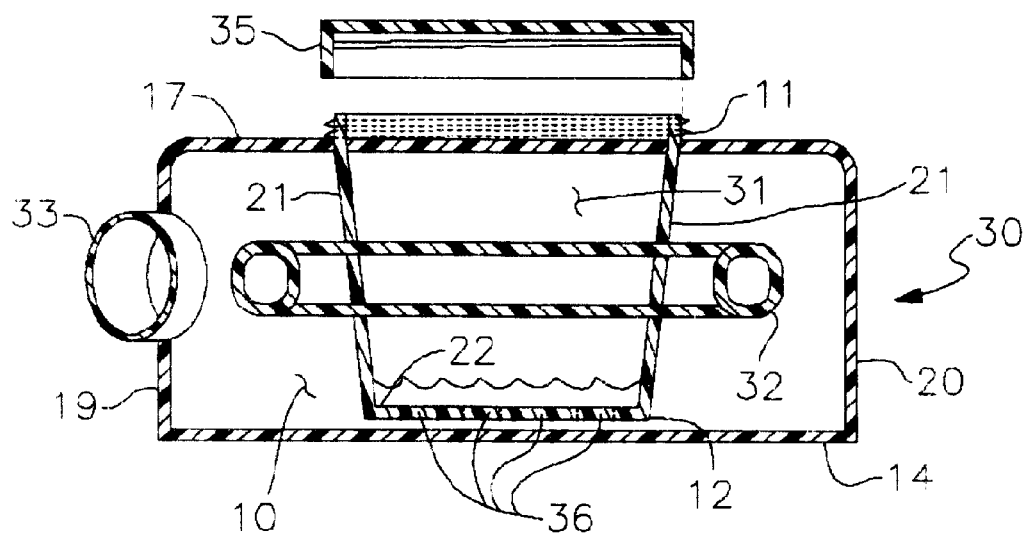
FIG. 3 An end view of the present invention.

FIG. 3 shows the handle end elevation drawing of the invention with the screw-on lid 35 of the drinking bowl 31. The screw-on lid 35 has a rubber gasket 15 to create a sealed drinking bowl 31, and to prevent leakage when it is being carried like a suitcase, or when it is not in use. Threads 37 are on protruding part 11, of drinking bowl 31, to receive screw on-off lid 35. One or more holes 36, can be positioned anywhere on drinking bowl bottom 22, or on the lower portion of drinking bowl wall 21, depending on the desired liquid level of the drinking bowl. The height of the container is low profile to prevent tipping over, while in use at home or in a moving vehicle.

FIG. 4 is a side view elevation of the side of the container 30, which shows carrying handle 32, and is used as an aide in refilling container 30. The handle is also an aid in picking up the container 30, from its flat, in use position on the floor, to carrying it. Drinking bowl 31, projects above the container top at protruding part 11. The open top drinking bowl 31, is a cylinder or frusto-conical integral part of the container 30, and is attached to top 17, at 11, and its bottom, 22, and may be about ⅛ in. up from bottom 14, of the container at 12. Holes 36, may preferably be about ½ in. in diameter but may be of any suitable size to achieve the desired amount of flow from the reservoir to the receptacle. Holes 36 at the bottom of drinking bowl 31, allow the liquid contents of reservoir 10, to refill the drinking bowl, as the liquid is consumed by the animal. When liquid 13, is consumed from drinking bowl 31, liquid level 13, drops to a lower level allowing air to enter reservoir 10, which breaks the vacuum and lets liquid enter through holes, 36, replacing the consumed liquid back to its original level 13, about ½ in. deep. At this point, because of the imperforate nature of top, 17, bottom, 14, and sides 16, 18, 19 & 20 in FIG. 5, defining reservoir 10, a vacuum seal or lock is established, and in turn no more liquid can flow through holes 36, into drinking bowl 31. Thus, this container provides an automatic filling function without the constant attention of the animal handler. Holes 36, at the bottom of the drinking bowl, can be moved up the sides or wall, 21, of drinking bowl 31, to increase the drinkable liquid level, 13, and can be placed anywhere on the bottom of drinking bowl 31. The reason for the low level of accessible liquid 13, in drinking bowl 31, is what minimizes the amount of liquid moving about in drinking bowl 31, which eliminates splashing and spilling while the container is in use in a moving vehicle. Holes 36, could be more in amount and larger in size, to increase the flow speed into drinking bowl 31, if needed. The smaller amount and size of holes 36, eliminates the surge of liquid from reservoir 10, to drinking bowl 31, when the container is subjected to abrupt movements, such as being bumped or in a moving vehicle. Water level 9 in FIG. 4 shows the reservoir when full and when in use flat or floor. The drinking bowl can be constructed with threads 38, where it is connected to top 17, of container, in order to remove it from container, for cleaning inside of reservoir.

FIG. 5 is a top view drawing of the present invention and is designed as rectangular, but can be shaped round, square, or oval. The illustrated drawing shows in detail the liquid filling spout 33, and lid 34, able to be coupled thereto by a screw-on threadmethod, and can be selectively removed, to permit refilling of the container reservoir 10. Lid 34, has a rubber gasket 14, to create an air tight reservoir. The air-vacuum tightness of the reservoir is what maintains the vacuum drinking bowl feeding concept. An open top bowl 31, is positioned at the handle end 16, on top 17, of container 30, is where the liquid is accessible to the animal. The reason for the separated drinking bowl 31, from the reservoir is to reduce the amount of liquid exposed to evaporation or contamination and to control the low level of liquid. The amount of evaporation is concluded by the percentage of the area of the drinking bowl 31, top opening, to the area of reservoir 10. In this drawing, the bowl top opening is about 10% of the area of the reservoir, which would reduce the evaporation about 90%, which would supply the animal with liquid 90% longer than most other animal drinking bowls. The Portable Animal Watering Container can range from a small 1 pt. Size container for small dogs or cats, to a 1 gal. size container for large dogs, to a 10 gal. size container for horses, and so on.

Figure 6:
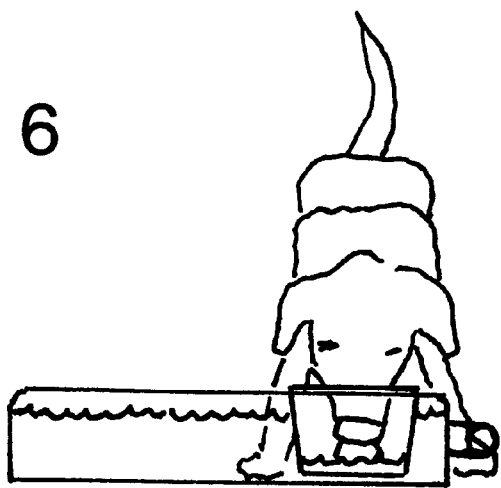
FIG. 6 An illustration of a dog drinking out of the present invention.
Figure 7:
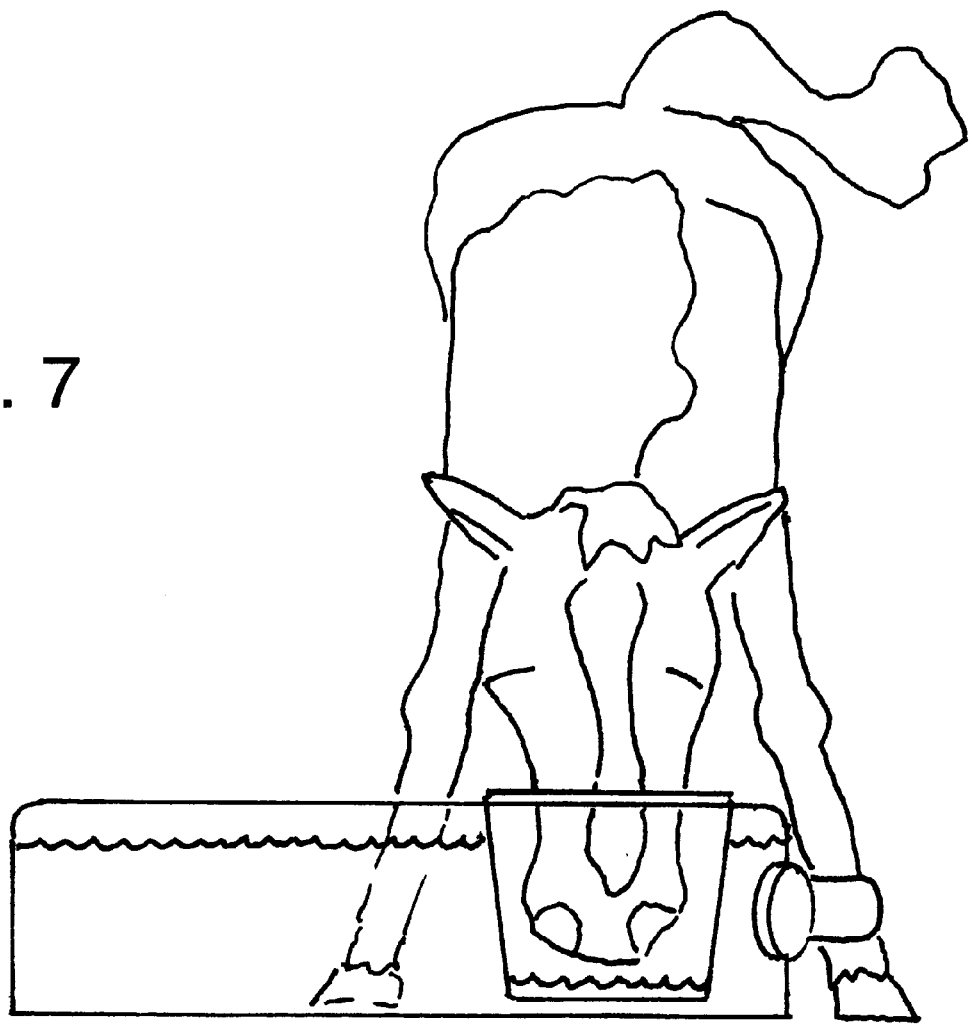
FIG. 7 An illustration of a pony drinking out of the present invention.

FIG. 6 is an illustration of a dog drinking from the present invention and FIG. 7 is an illustration of a pony drinking from the present invention. As is evident, the container can come in many sizes to suit the particular need without departing from the essential advantages of the present invention.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. An article of manufacture for a portable animal watering container comprising:

a fluid reservoir having a resealable opening disposed at one end of said reservoir adjacent a handle on said reservoir for accessing liquid where said reservoir is capable of carrying a volume of liquid;

an open receptacle coupled to and situated asymmetrically in said reservoir near said opening, the receptacle having aperture on its bottom surface permitting communication between an interior of the reservoir and the receptacle; and wherein said apertures permit entry of said liquid into said receptacle, up to a low level, to minimize spillage of the liquid from the receptacle.

2. An article of manufacture for a portable animal watering container as claimed in claim 1 wherein said reservoir is made of clear material.

3. An article of manufacture for a portable animal watering container as claimed in claim 1 wherein said coupling is by mutual threading on said receptacle and said reservoir.

4. An article of manufacture for a portable animal watering container as claimed in claim 1 wherein said apertures are located on the bottom surface of said receptacle to minimize spillage of said liquid when transporting said container.

5. An article of manufacture for a portable animal watering container as claimed in claim 1 wherein said apertures are sized to permit a small amount of liquid to enter said receptacle at any one time.

6. An article of manufacture for a portable animal watering container as claimed in claim 5 further comprising a liquid tight lid for said receptacle.

7. An article of manufacture for a portable animal watering container as claimed in claim 1 wherein said receptacle is shaped in a frusto-conical.

8. An article of manufacture for a portable animal watering container as claimed in claim 1 wherein said receptacle is generally cylindrical.

9. An article of manufacture for a portable animal watering container comprising:

a fluid reservoir having a resealable opening for accessing liquid and capable of carrying a volume of liquid;

a removable coverable receptacle threaded into said reservoir near the opening, the receptacle having apertures on its bottom surface permitting vacuum regulated communication between an interior of the reservoir and the receptacle; and wherein said apertures permit entry of said liquid into said receptacle up to a low level, to minimize spillage of the liquid from said receptacle.

10. An article of manufacture for a portable animal watering container as claimed in claim 9 wherein said apertures are located on the bottom surface of said receptacle to minimize spillage of said liquid when transporting said container.

11. An article of manufacture for a portable animal watering container as claimed in claim 9 wherein said open receptacle is frusto-conically shaped.

12. An article of manufacture for a portable animal watering container comprising:

a fluid reservoir having a resealable opening disposed at one end of said reservoir adjacent a handle on said reservoir for accessing liquid where said reservoir is capable of carrying a volume of liquid;

an open receptacle sized for allowing access to an animal for drinking coupled to and situated asymetrically in said reservoir near said opening, the receptacle having apertures on its bottom surface permitting communication between an interior of the reservoir and the receptacle; and wherein said apertures permit entry of said liquid into said receptacle, up to a low level, to minimize spillage of the liquid from the receptacle.

\* \* \* \* \*